(12) United States Patent
Atsuta (10) Patent No.: US 7,701,116 B2
(45) Date of Patent: Apr. 20, 2010

(54) MOTOR DRIVING METHOD, PROGRAM THEREFOR, AND MOTOR DRIVING APPARATUS

(75) Inventor: Akio Atsuta, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 11/554,238

(22) Filed: Oct. 30, 2006

(65) Prior Publication Data

US 2007/0108870 A1  May 17, 2007

(30) Foreign Application Priority Data

Nov. 15, 2005   (JP)   ............................. 2005-330681

(51) Int. Cl.
*H02N 2/06* (2006.01)

(52) U.S. Cl. ...................... 310/317; 310/328

(58) Field of Classification Search ................. 310/317, 310/328
See application file for complete search history.

(56) References Cited

U.S. PATENT DOCUMENTS

| | | | |
|---|---|---|---|
| 5,134,333 A | 7/1992 | Atsuta | |
| 5,231,325 A | 7/1993 | Tamai et al. | |
| 5,298,829 A | 3/1994 | Tsukimoto et al. | |
| 5,461,273 A | 10/1995 | Kawasaki et al. | |
| 5,612,598 A | 3/1997 | Fukui et al. | |
| 5,656,881 A | 8/1997 | Atsuta | |
| 5,920,144 A | 7/1999 | Atsuta | |
| 5,986,385 A | 11/1999 | Atsuta | |
| 6,987,345 B2* | 1/2006 | Yamamoto | 310/316.01 |
| 7,109,639 B2 | 9/2006 | Yamamoto et al. | |
| 2002/0008439 A1* | 1/2002 | Senda et al. | 310/316.02 |
| 2004/0256951 A1* | 12/2004 | Fujimoto et al. | 310/317 |
| 2004/0262925 A1* | 12/2004 | Seki et al. | 290/40 A |
| 2005/0067921 A1* | 3/2005 | Yamamoto | 310/317 |
| 2006/0006762 A1* | 1/2006 | Matsuzaki et al. | 310/317 |

FOREIGN PATENT DOCUMENTS

| | | |
|---|---|---|
| JP | 03-289375 | 12/1991 |
| JP | 4-75479 | 3/1992 |
| JP | 6-237584 | 8/1994 |
| JP | 2004-239408 | 8/2004 |
| JP | 2004-242448 | 8/2004 |
| JP | 2004-320846 | 11/2004 |
| JP | 2005-073465 | 3/2005 |

* cited by examiner

*Primary Examiner*—Walter Benson
*Assistant Examiner*—Derek J Rosenau
(74) *Attorney, Agent, or Firm*—Fitzpatrick, Cella, Harper & Scinto (57) ABSTRACT

Provided are a motor driving method, a program therefor, and a motor driving apparatus which can shorten starting time of a vibration wave motor. A driving circuit of the vibration wave motor includes a control unit. The control unit controls two-phase driving voltages applied to an electro-mechanical energy conversion element of the vibration wave motor. The control unit controls a phase difference between the two-phase driving voltages to drive a driven member at a predetermined speed in a fixed state of frequencies of the two-phase driving voltages. In this case, when the phase difference is set outside a predetermined range, the control unit changes the frequencies of the two-phase driving voltages.

14 Claims, 9 Drawing Sheets

A MODE

FIG. 13B

B MODE

MOTOR DRIVING METHOD, PROGRAM THEREFOR, AND MOTOR DRIVING APPARATUS

BACKGROUND OF THE INVENTION

1. Field of the Invention

The present invention relates to a motor driving method, a program therefor, and a motor driving apparatus, which are applied to a driving circuit of a vibration wave motor for relatively moving a driven member which is in contact with an elastic member (i.e., vibration member) having a vibration wave generated therein by a frictional force.

2. Description of the Related Art

In recent years, a vibration wave (i.e., vibration type) motor of a nonelectromagnetic driving system called a vibration wave motor or a piezoelectric motor has been developed, and put into practical use by the applicants of the present invention. The vibration wave motor is configured to apply an alternating voltage to an electro-mechanical energy conversion element such as a piezoelectric element or an electrostrictive element thereby generating a high-frequency vibration therein, and to take out vibration energy as continuous mechanical motion. An operation principle of the vibration wave motor is described in many patent applications such as in Japanese Patent Application Laid-Open No. H03-289375, and thus description thereof will be omitted.

Figure 12:
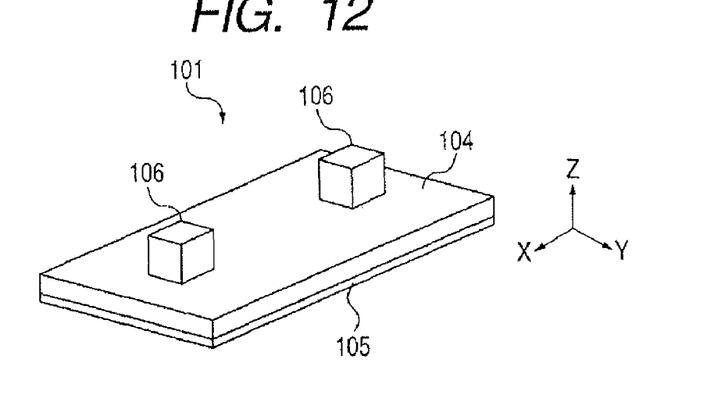
FIG. 12 is a perspective view showing an appearance of a vibration member of a vibration wave actuator of a linear driving type according to a conventional example.

FIG. 12 is a perspective view showing an appearance of a vibration member of a vibration wave actuator of a linear driving type according to a conventional example.

Referring to FIG. 12, a vibration member 101 includes an elastic member 104, a piezoelectric element (electromechanical energy conversion element) 105, and two projection portions 106. As a technology regarding the vibration wave actuator is well-known in, e.g., Japanese Patent Application Laid-Open No. 2004-320846, detailed description thereof will be omitted. The elastic member 104 is made of a metallic material and formed into a rectangular plate shape. The piezoelectric element 105 is bonded to a back surface of the elastic member 104, and the projection portions 106 are disposed in a front surface of the elastic member 104.

The vibration member 101 can excite vibrations of two bending vibration modes, and generates elliptic motion in tips of the projection portions 106 by combining the vibrations of the two bending vibration modes. In other words, the projection portions 106 are designed such that the tips are brought into contact with a driven member (i.e., slider) as described below to move the driven member by elliptic motion generated in the tips.

Figure 13A:
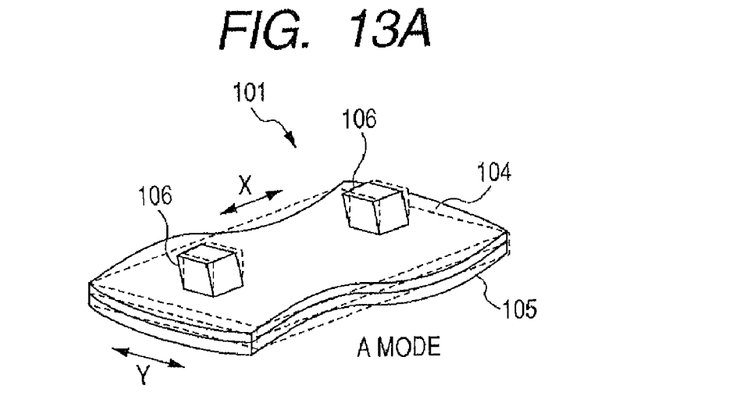
FIG. 13A is a view showing a vibration of one bending vibration mode (i.e., A mode) in the vibration member of FIG. 12.
Figure 13B:
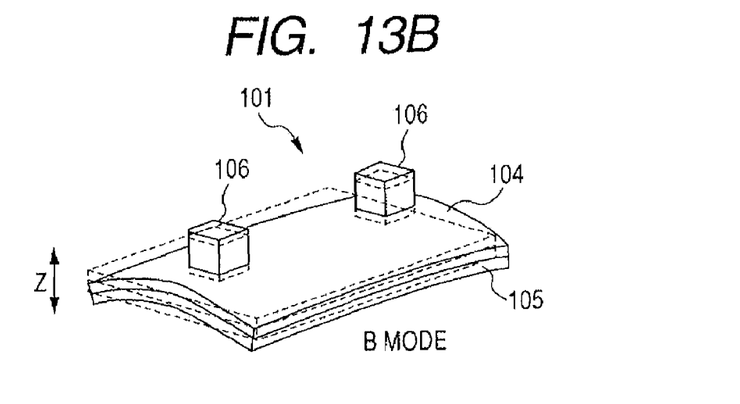
FIG. 13B is a view showing a vibration of the other bending vibration mode (i.e., B mode) in the vibration member of FIG. 12.

FIGS. 13A and 13B are views showing vibrations of the two bending vibration modes of the vibration member 101. FIG. 13A shows a vibration of one bending vibration mode, and FIG. 13B shows a vibration of the other bending vibration mode.

The vibration mode of FIG. 13A represents one (referred to as "A mode" hereinafter) of the two bending vibration modes. A vibration of the A mode is a secondary bending vibration in a longitudinal direction (i.e., direction of the arrow X) of the rectangular vibration member 101 (or elastic member 104), and has three parallel nodes in a short direction (i.e., direction of the arrow Y). The projection portions 106 are arranged near positions which become nodes in vibration of the A mode, and reciprocated in the direction of the arrow X by the vibration of the A mode. With this arrangement of the projection portions 106, it is possible to displace the projection portions 106 most greatly in the direction of the arrow X.

The vibration mode of FIG. 13B represents one (referred to as "B mode" hereinafter) of the two bending vibration modes. A vibration of the B mode is a primary bending vibration in a short direction (i.e., direction of the arrow Y) of the rectangular vibration member 101 (or elastic member 104), and has two parallel nodes in a longitudinal direction (i.e., direction of the arrow X). The nodes in the vibration of the A mode and the nodes in the vibration of the B mode are roughly orthogonal to each other in an XY plane. The projection portions 106 are arranged near positions where an antinode occurs in vibration of the B mode, and reciprocated in a direction of an arrow Z by the vibration of the B mode. With this arrangement of the projection portions 106, it is possible to displace the projection portions 106 most greatly in the direction of the arrow Z.

In other words, by setting the nodes in the vibrations of the A and B modes roughly orthogonal to each other as described above, the positions of the nodes in the vibration of the A mode can be matched with the positions of the antinode in the vibration of the B mode. By arranging the projection portions 106 in those positions, vibration displacements of the projection portions 106 can be made greatest, enabling acquisition of a high output. By greatly displacing the projection portions 106 in the directions of the arrows X and Z, it is possible to apply a large driving force to the driven member brought into contact with the projection portions 106.

Figure 14:
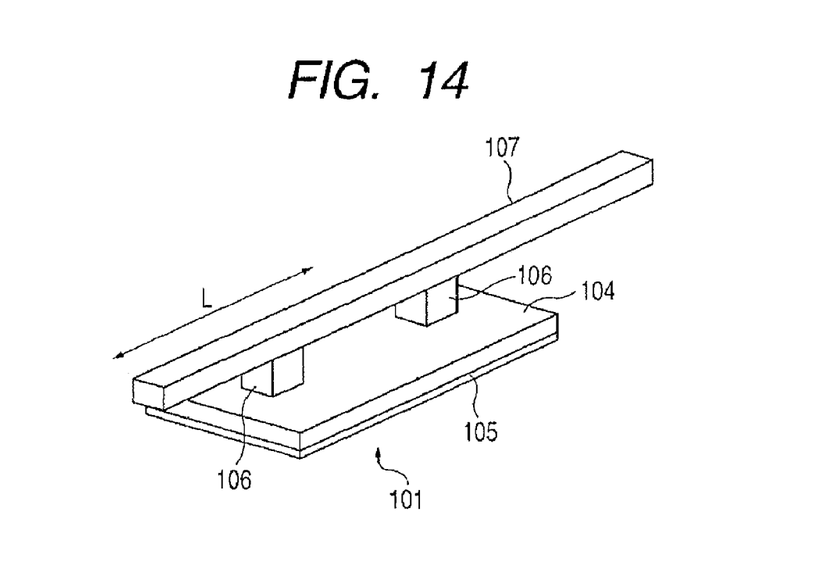
FIG. 14 is a perspective view showing an appearance of a vibration wave actuator which uses the vibration member of FIG. 12.

FIG. 14 is a perspective view showing an appearance of a vibration wave actuator which uses the vibration member of FIG. 12.

Referring to FIG. 14, the vibration wave actuator moves a slider 107 by the vibration member 101 constituted of the elastic member 104, the piezoelectric element 105, and the projection portions 106. The vibration wave actuator can generate elliptic motion in the tips of the projection portions 106 by generating vibrations of the A and B modes with a predetermined phase difference. The slider 107 serving as a driven member is pressed into contact with the tips of the projection portions 106. The slider 107 can be moved in a direction of the arrow L by the elliptic motion of the projection portions 106.

By arranging the two projection portions 106 symmetrically with respect to an XZ plane or a YZ plane passing through a center of the elastic member 104, the vibration member 101 can unevenly receive a reaction force received from the slider 107 on the projection portions 106. Because of a stable relative positional relation between the slider 107 and the projection portions 106, it is possible to stabilize an output of the vibration member 101 without any influence of a fluctuation or the like in environment or load.

In the vibration wave motor, as disclosed in Japanese Patent Application Laid-Open No. H01-085587 or JP 3382454 B, when speed control is executed, a method of gradually reducing a driving frequency from a high side and executing pulse width control or phase difference control by a driving frequency when a certain speed is reached is employed.

Figure 15:
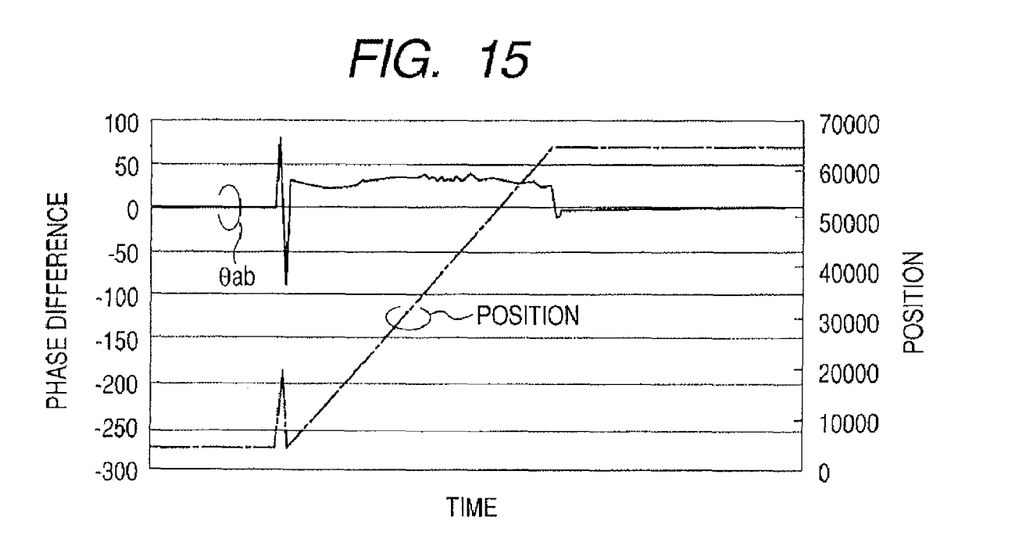
FIG. 15 is a diagram showing a relation between an AB phase difference and a motor position with respect to time in control where frequency sweeping is executed in a vibration wave motor according to another conventional example.

FIG. 15 shows a relation between an AB phase difference and a motor position described below with respect to time in control of executing frequency sweeping in a vibration wave motor of another conventional example. The frequency sweeping refers to an operation of gradually changing a frequency from high to low.

In FIG. 15, an abscissa indicates time, while an ordinate indicates a phase difference (referred to as "AB phase difference" hereinafter) of two-phase driving voltages (i.e., driving voltages of A and B phases) applied to the piezoelectric element of the vibration wave motor. Characteristics shown in the drawing indicate a relation between the AB phase difference and the motor position in a case where when frequency sweeping is carried out and a driving frequency reaches a target speed, the driving frequency is fixed at this frequency, and the apparatus is operated while changing a target position of the slider with the AB phase difference.

After execution of the frequency sweeping by fixing the AB phase difference, it is possible to drive the vibration wave motor of a driving frequency at which control characteristics of AB phase difference control are stabilized by using an algorithm for deciding a driving frequency at which the driven member is set to a certain speed. A numerical value of the ordinate of the right side of the characteristics shown in FIG. 15 is a count value of an encoder for detecting a slider moving amount.

However, as the frequency sweeping is an operation which relatively requires time, it takes time to start the vibration wave motor.

SUMMARY OF THE INVENTION

It is an object of the present invention to provide a motor driving apparatus capable of shortening starting time of a vibration wave motor and smoothly controlling a moving member, a motor driving method, and a program therefor.

In order to achieve the above-mentioned object, according to an aspect of the present invention, there is provided a motor driving method for controlling driving of a vibration wave motor including a vibration member for generating a vibration by applying two-phase driving voltages to an electromechanical energy conversion element, and a driven member which is in contact with the vibration member and driven by the vibration generated in the vibration member, including the steps of: detecting a driving speed of the driven member; and controlling frequencies of two-phase driving voltages and a phase difference between the two-phase driving voltages, and in the motor driving method, the control step includes controlling frequencies of the two-phase driving voltages according to the phase difference between the two-phase driving voltages and the driving speed of the driven member when the two-phase driving voltages are applied to the electro-mechanical energy conversion element.

Similarly, in order to achieve the above-mentioned object, according to another aspect of the present invention, there is provided a storage medium, which stores a program for executing a motor driving method for controlling driving of a vibration wave motor including a vibration member for generating a vibration by applying two-phase driving voltages to an electromechanical energy conversion element, and a driven member which is in contact with the vibration member and driven by the vibration generated in the vibration member, and in the storage medium, the program includes: a code for executing a detection step of detecting a driving speed of the driven member; and a code for executing a control step of controlling frequencies of two-phase driving voltages and a phase difference between the two-phase driving voltages, in which the code for executing the control step includes a code for controlling frequencies of the two-phase driving voltages are according to the phase difference between the two-phase driving voltages and the driving speed of the driven member when the two-phase driving voltages are applied to the electromechanical energy conversion element.

Similarly, in order to achieve the above-mentioned object, according to another aspect of the present invention, there is provided a motor driving apparatus for controlling driving of a vibration wave motor including a vibration member for generating a vibration by applying two-phase driving voltages to an electromechanical energy conversion element, and a driven member which is in contact with the vibration member and driven by the vibration generated in the vibration member, including: a detection unit for detecting a driving speed of the driven member; and a control unit for controlling frequencies of two-phase driving voltages and a phase difference between the two-phase driving voltages, and in the control unit of the motor driving apparatus, frequencies of the two-phase driving voltages are controlled according to the phase difference between the two-phase driving voltages and the driving speed of the driven member when the two-phase driving voltages are applied to the electromechanical energy conversion element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

DESCRIPTION OF THE EMBODIMENTS

The following description of various exemplary embodiments, features and aspects of the present invention is merely illustrative in nature and is in no way intended to limit the invention, its application, or uses.

First Embodiment

Figure 1:
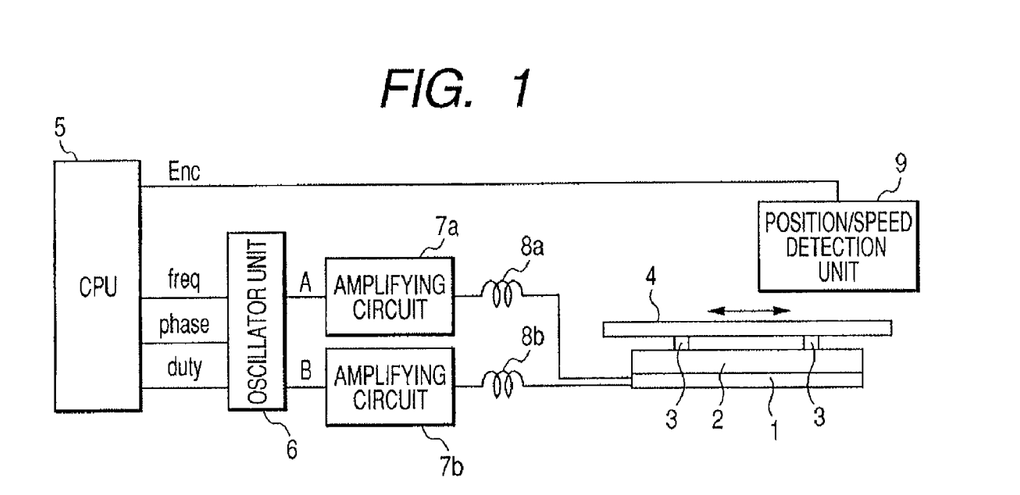
FIG. 1 is a block diagram showing a configuration of a vibration wave motor driving circuit as a motor driving apparatus according to a first embodiment of the present invention.

FIG. 1 is a block diagram showing a configuration of a vibration wave motor driving circuit as a motor driving apparatus according to a first embodiment of the present invention.

Referring to FIG. 1, a vibration wave motor is a compact nonelectromagnetic driving type motor which includes a piezoelectric element 1 and a vibration member 2 and moves a moving member (slider) 4 in an arrow direction. The vibration wave motor driving circuit includes a microcomputer (CPU) 5, an oscillator unit 6, amplifier circuits 7a and 7b, inductance elements 8a and 8b, and a position/speed detection unit 9.

In the vibration wave motor, the piezoelectric element 1 is an electro-mechanical energy conversion element for exciting high-frequency vibrations by applying two-phase driving voltages described below. The vibration member 2 is an elastic member having the piezoelectric element 1 bonded to its bottom surface and projection portions 3 arranged in its upper surface. In the vibration member 2, vibrations of two bending vibration modes (i.e., first bending vibration mode (A mode) which is a secondary bending vibration in a vibration member longitudinal direction, and a second bending mode (B mode) which is a primary bending vibration in a vibration member crosswise direction) are generated by the piezoelectric element 1. By combining the vibrations of the A and B modes, the vibration member 2 and the moving member 4 are relatively driven, and the moving member 4 is moved in an arrow direction (to a target position) via the projection portions 3 by a frictional force. The projection portions 3 are disposed in the same positions as those of the aforementioned conventional example.

In the vibration wave motor driving circuit, the CPU 5 controls the vibration wave motor described below, and outputs a freq signal (indicating oscillation frequency setting value), a phase signal (indicating phase difference setting value) and a duty signal (indicating duty setting value) to the oscillator unit 6. The CPU 5 executes each processing shown in the flowcharts of FIGS. 9 and 11 (which illustrate third and fourth embodiments, respectively) based on a program. The oscillator unit 6 generates signals (i.e., driving signals of the A and B modes) for respectively driving the vibration wave motor in the A and B modes according to the setting values output from the CPU 5.

The amplifier circuit 7a amplifies the driving signal of the A mode, and supplies it to the piezoelectric element 1 of the vibration wave motor via the inductance element 8a to apply a driving force to the vibration wave motor. The amplifier circuit 7b amplifies the driving signal of the B mode, and supplies it to the piezoelectric element 1 of the vibration wave motor via the inductance element 8b to apply a driving force to the vibration wave motor. The position/speed detection unit 9 detects a moving amount of the moving member 4, and outputs an encoder signal (i.e., position detection signal) to the CPU 5. The CPU 5 controls driving of the vibration wave motor according to information (i.e., position information and speed information of the moving member 4) based on the moving amount of the moving member 4 detected by the position/speed detection unit 9.

Figure 2:
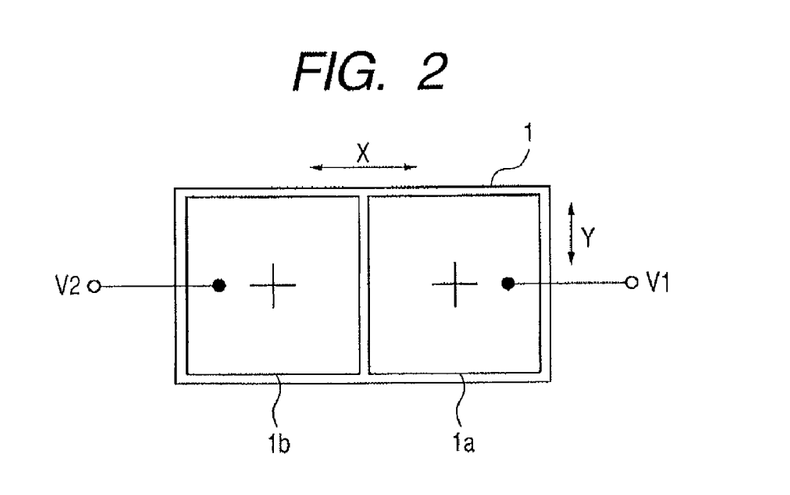
FIG. 2 is a diagram showing an electrode pattern of a piezoelectric element of a vibration wave motor.

FIG. 2 is a diagram showing an electrode pattern of the piezoelectric element of the vibration wave motor.

Referring to FIG. 2, the piezoelectric element 1 includes two equally divided electrode areas 1a and 1b in a longitudinal direction (i.e., X direction). Polarizing directions of the electrode areas 1a and 1b are identical (i.e., both are indicated by "+"). An alternating voltage (V1) is applied to the electrode area 1a located on the right side, of the electrode areas 1a and 1b. An alternating voltage (V2) is applied to the electrode area 1b located on the left side. In other words, two-phase (V1: A phase, and V2: B phase) alternating voltages (driving voltages) of equal frequencies are applied to the electrode areas 1a and 1b.

Presuming that V1 and V2 are alternative voltages which have frequencies near a resonance frequency of the A mode and are reverse phases (in which phases are shifted by 180°), the piezoelectric element of the right electrode area 1a is contracted while the piezoelectric element of the left electrode area 1b is elongated at a certain instant. At another instant, a relation is reversed (i.e., the piezoelectric element of the right electrode area 1a is elongated while the piezoelectric element of the left electrode area 1b is contracted). As a result, a vibration of the A mode is generated in the vibration member 2.

Presuming that V1 and V2 are alternating voltages which have frequencies near a resonance frequency of the B mode and are identical phases, all the piezoelectric elements (i.e., electrode areas 1a and 1b) are elongated at a certain instant. At another instant, all the piezoelectric elements (i.e., electrode areas 1a and 1b) are contracted. As a result, a vibration of the B mode is generated in the vibration member 2.

A polarizing direction in one of the two electrode areas 1a and 1b of the piezoelectric element 1 can be set to "+" while that in the other electrode area can be set to "−". In this case, it is possible to generate a vibration of the A mode in the vibration member 2 by applying alternating voltages (V1 and V2) which have frequencies near the resonance frequency of the A mode and are identical phases to the electrode areas 1a and 1b. It is also possible to generate a vibration of the B mode in the vibration member 2 by applying alternative voltages (V1 and V2) which have frequencies near the resonance frequency of the B mode and are reversed phases (in which phases are shifted by 180°).

Figure 3:
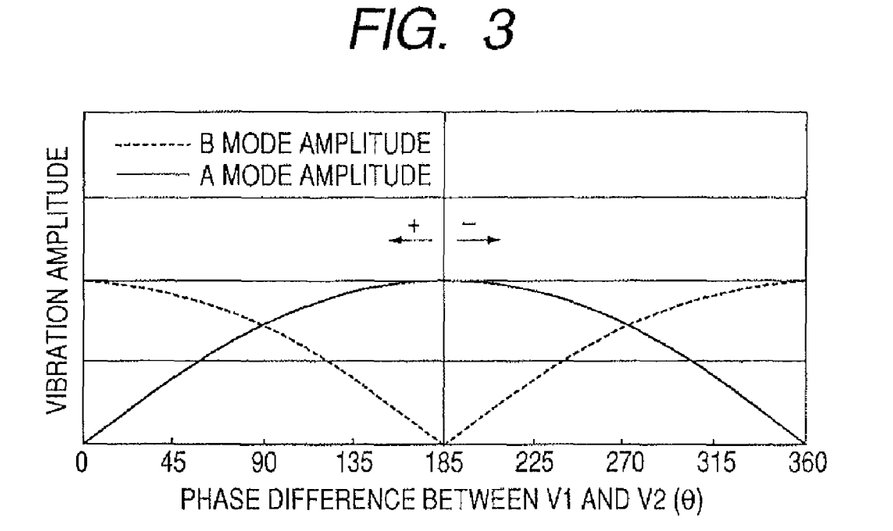
FIG. 3 is a diagram showing a relation between a phase difference and vibration amplitude of voltages applied to the piezoelectric element of the vibration wave motor.

FIG. 3 is a diagram showing a relation between a phase difference of voltages applied to the piezoelectric element of the vibration wave motor and vibration amplitude.

Referring to FIG. 3, an abscissa indicates a phase difference θ between the alternative voltages V1 and V2 respectively applied to the electrode areas 1a and 1b of the piezoelectric element 1, and an ordinate indicates vibration amplitude. Characteristics shown in FIG. 3 indicate a relation between amplitude sizes of the vibration modes (i.e., A and B modes) and the phase difference θ of V1 and V2. In the case of the phase difference of a vibration of the B mode with respect to a vibration of the A mode, 90° and −90° are switched with a phase difference 180° of V1 and V2 set as a boundary. In other words, with the phase difference 180° of V1 and V2 as a boundary, driving directions of the moving member 7 are reversed between both sides (i.e., + and − directions in the drawing).

Accordingly, the compact vibration wave motor of this embodiment excites the two bending vibration modes by the arrangement of the electrode areas 1a and 1b of the piezoelectric element 1 shown in FIG. 2, and has the following features as compared with a conventional annular vibration wave motor. By changing the phase difference of the alternating voltages (V1 and V2), it is possible to easily change a ratio of the vibration sizes of the A and B modes. Thus, by controlling the AB phase difference described below, it is possible to easily change the driving speed of the moving member 4 as can be understood from FIG. 5.

Figure 4:
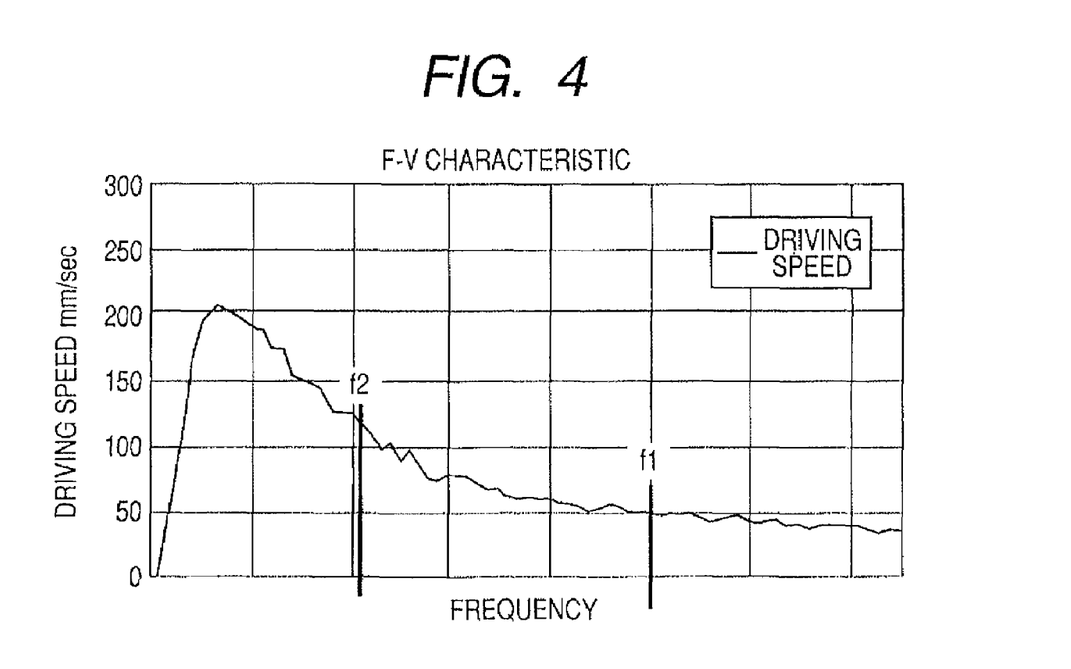
FIG. 4 is a diagram showing a relation between a driving frequency and a driving speed of a moving member when an AB phase difference of the vibration wave motor is 90°.

FIG. 4 is a diagram showing a relation between a driving frequency and a driving speed of the moving member when the AB phase difference of the vibration wave motor is 90°.

Referring to FIG. 4, an abscissa indicates a driving frequency (Hz) of the vibration wave motor, and an ordinate indicates a driving speed (mm/second) of the moving member 4 by the vibration wave motor. In the abscissa, a frequency is higher toward the right, and lower toward the left. Characteristics shown in FIG. 4 indicate a relation between a driving frequency and a driving speed of the moving member 4 when an AB phase difference of the vibration wave motor (i.e., phase difference between A-phase and B-phase voltages respectively applied to the electrode areas 1a and 1b of the piezoelectric element of the driving wave motor) is 90°.

Figure 5:
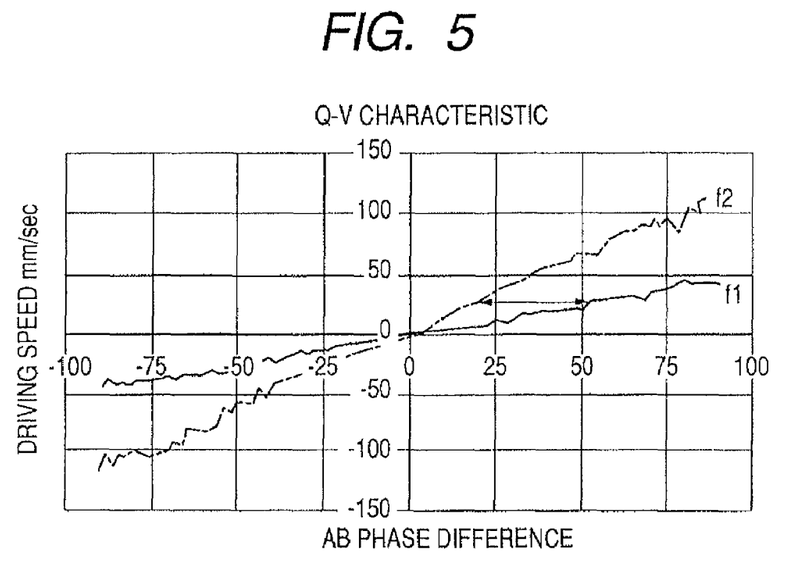
FIG. 5 is a diagram showing a relation between the AB phase difference and the driving speed of the moving member at frequencies f1 and f2.

FIG. 5 is a diagram showing a relation between the AB phase difference and the driving speed of the moving member at driving frequencies f1 and f2 of FIG. 4.

Referring to FIG. 5, an abscissa indicates an AB phase difference, and an ordinate indicates a driving speed (mm/second) of the moving member 4 by the vibration wave motor. Characteristics shown in FIG. 5 indicate a relation between the AB phase difference and the driving speed of the moving member 4 at the driving frequencies f1 and f2 of FIG. 4.

As can be understood from FIGS. 4 and 5, in the characteristics indicating the relation between the AB phase difference and the driving speed of the moving member, inclination is smaller for the high driving frequency f1 as compared with that for the low driving frequency f2. Accordingly, in the case of the high driving frequency f1, a change in driving speed is small when the AB phase difference is shifted (i.e., changed within a certain range). Conversely, in the case of the low driving frequency f2, a change in driving speed is large when the AB phase difference is shifted (i.e., changed within a certain range). Presuming that the moving member 4 is driven at a constant speed by the vibration wave motor, the AB phase difference when the high driving frequency f1 is set is larger in absolute value than that when the low driving frequency f2 is set.

Figure 6:
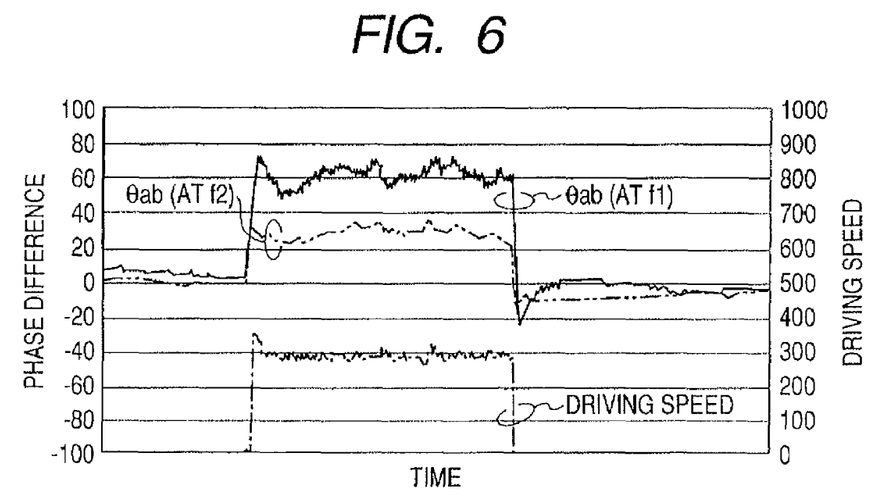
FIG. 6 is a diagram showing an operation amount of the AB phase difference when the moving member is controlled to have a certain driving speed in the vibration wave motor.

FIG. 6 is a diagram showing an operation amount of the AB phase difference when the moving member is controlled to a certain driving speed in the vibration wave motor. In the embodiment, the CPU5 performs a feedback control by using the speed information of the moving member 4, which is obtained by the position/speed detection unit 9, and controls a phase difference between the driving frequencies f1 and f2 so that the driving member 4 drives to the predetermined position with the predetermined speed. That is, the CPU5 performs the speed detection operation of the drive speed of the driving member 4 and the control operation of the voltage of A phase and B phase and frequency, in parallel with each other.

Referring to FIG. 6, an abscissa indicates time, and an ordinate indicates an AB phase difference. θab (at f1) and θab (at f2) respectively denote operation amounts of the AB phase difference at the driving frequencies f1 and f2 shown in FIG. 4. The operation amount of the AB phase difference is decided by the CPU 5. As can be understood from FIG. 6, when the moving member 4 is driven at a constant speed by the vibration wave motor, an operated AB phase difference (simply referred to as "AB phase difference" hereinafter) varies depending on a difference between driving frequencies. Accordingly, by judging an operation amount of the AB phase difference at the CPU 5, it is possible to roughly know which of the driving frequencies is employed for driving.

Though not shown in FIG. 6, when a driving frequency is higher than f1 and the moving member 4 is driven at the same driving speed of FIG. 6, a necessary AB phase difference exceeds 90°. As can be understood from FIG. 5, it is when the AB phase difference is set to 90° that a maximum driving speed can be set in the state of controlling the phase difference alone while fixing the driving frequency, and the AB phase difference is maintained at 90° when a necessary driving speed cannot be set. Needless to say, in this state, control to further increase the driving speed is impossible. Thus, it is advised to lower the driving frequency to a controllable frequency such as f1.

Conversely, when the driving frequency is lower than f2, the driving speed of the moving member 4 is greatly changed only by slightly changing the AB phase difference, causing oscillation when speed control is executed. When the driving frequency is further lowered, as shown in FIG. 4, it exceeds a resonance state of the vibration wave motor, causing a problem of entry into an area where the driving speed cannot be increased suddenly.

According to this embodiment, stable control is enabled by controlling the driving frequency so that the AB phase difference operated at a certain driving speed can enter a set range (i.e., range of 30° to 80° to be specific) However, as the AB phase difference becomes nearly 0 and unable to satisfy the above-mentioned range when the moving member 4 is stopped or the like, data of an area in which the moving member 4 is at a stop must not be used. Thus, by detecting the AB phase difference and changing the driving frequency under certain conditions, it is possible to find a driving frequency at which the AB phase difference control is stabilized.

described above, according to this embodiment, the driving frequency is controlled so that the AB phase difference can enter the set range when the moving member 4 is driven at a desired driving speed by the vibration wave motor. As a result, it is possible to drive the vibration wave motor without executing an operation of detecting an optimal driving frequency at the time of starting the vibration wave motor. Hence, it is possible to shorten the starting time of the vibration wave motor, and to smoothly control the moving member.

Second Embodiment

A second embodiment of the present invention is different from the first embodiment in that control described below is carried out in a vibration wave motor. Other features of this embodiment correspond to those of the first embodiment (described with reference to FIGS. 1 and 2), and thus description thereof will be omitted.

Figure 7:
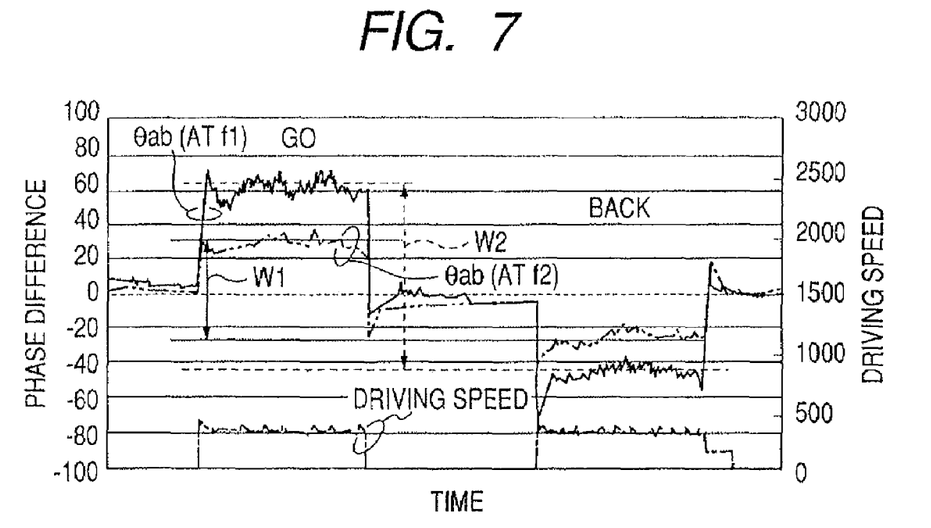
FIG. 7 is a diagram showing a relation between an AB phase difference and a driving speed of a moving member with respect to time in a vibration wave motor according to a second embodiment of the present invention.

FIG. 7 is a diagram showing a relation between an AB phase difference and a driving speed of a moving member with respect to time in the vibration wave motor of this embodiment. In the embodiment, the CPU5 also performs a feedback control by using the speed information of the moving member 4, which is obtained by the position/speed detection unit 9, and also controls a phase difference between the driving frequencies f1 and f2 so that the driving member 4 drives to the predetermined position with the predetermined speed.

In FIG. 7, an abscissa indicates time, and an ordinate indicates an AB phase difference. According to the first embodiment, the driving frequency is changed from the AB phase difference when the moving member 4 is subjected to speed control to move in a certain direction. On the other hand, according to this embodiment, an AB phase difference is detected when a moving member 4 is subjected to speed control to reciprocate in a certain section.

As shown in FIG. 7, focusing on an operation amount of the AB phase difference when the moving member 4 is reciprocated in a certain section, it can be understood that values of operation amounts of the AB phase difference are different between going ("go" in FIG. 7) and returning ("back" in FIG. 7). This difference is generated because of a difference in operation characteristics of the vibration wave motor between go and back, and a difference in loads applied on an apparatus to which the vibration wave motor is mounted between go and back. Thus, if a driving frequency is to be changed from a value of an AB phase difference as in the case of the first embodiment, a problem of oscillation etc. occurs because of an influence of characteristics different between go and back.

Thus, according to this embodiment, AB phase differences between go and back when the moving member 4 is subjected to speed control to reciprocate in a certain section are detected, and whether to change a driving frequency is judged based on a width size of the detected AB phase differences.

Symbol W1 indicated by the solid arrow of FIG. 7 is an AB phase difference width which is a difference in AB phase difference at a driving frequency f2 between go and back. Symbol W2 indicated by the dotted arrow of FIG. 7 is an AB phase difference width which is a difference in AB phase difference at a driving frequency f1 between go and back.

Since it can be understood that a driving frequency is set higher as a difference in AB phase difference between go and back is larger, an operation of lowering the driving frequency is added. Conversely, since it can be understood that a driving frequency is set lower as a difference in AB phase difference between go and back is smaller, an operation of increasing the driving frequency is added. Accordingly, by executing control to set the difference in AB phase difference between go and back within a certain range at a CPU 5, it is possible to drive the vibration wave motor at an optimal driving frequency.

As described above, according to this embodiment, if the width of the operation amounts of the AB phase differences is large or small when the moving member 4 is reciprocated in a predetermined section (if set range is exceeded or not reached), the driving frequency is changed. Subsequently, the vibration wave motor can be driven without executing an operation of detecting an optimal driving frequency at the time of starting the vibration wave motor. Hence, it is possible to shorten the starting time of the vibration wave motor and to smoothly control the moving member.

Third Embodiment

A third embodiment of the present invention is different from the first embodiment in that control described below is carried out in a vibration wave motor. Other features of this embodiment correspond to those of the first embodiment (described with reference to FIGS. 1 and 2), and thus description thereof will be omitted.

Figure 8:
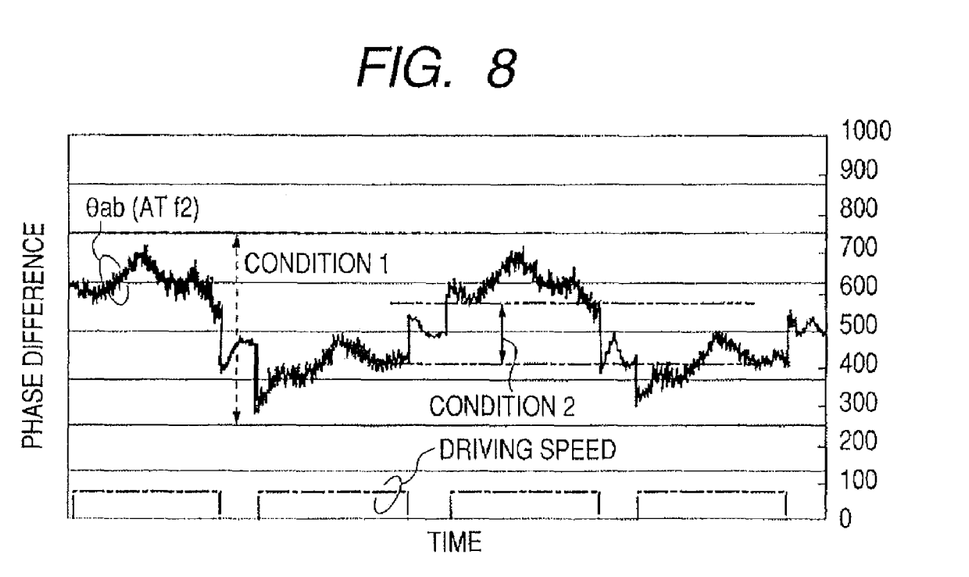
FIG. 8 is a diagram showing a relation between an AB phase difference and a driving speed of a moving member with respect to time in a vibration wave motor according to a third embodiment of the present invention.

FIG. 8 is a diagram showing a relation between an AB phase difference and a driving speed of a moving member with respect to time in the vibration wave motor of this embodiment.

In FIG. 8, an abscissa indicates time, and an ordinate indicates an AB phase difference. A condition 1 indicated by the dotted arrow of FIG. 8 corresponds to a judging condition of whether "Xab>80°" is satisfied or not in step S15 of FIG. 9. A condition 2 indicated by the solid arrow of FIG. 8 corresponds to a judging condition of whether "Xab<30°" of the step S15 is satisfied or not FIG. 9. According to the first and second embodiments, the driving frequency is changed when the average of the AB phase differences during the speed control of the moving member 4 exceeds a certain range.

On the other hand, according to this embodiment, setting of a driving frequency is changed based on information of all AB phase differences during reciprocation of a moving member 4, and the driving frequency can be controlled without taking out data only of a part subjected to speed control. Referring to FIG. 8, an operation algorithm of the vibration wave motor of FIG. 9 will be described below.

Figure 9:
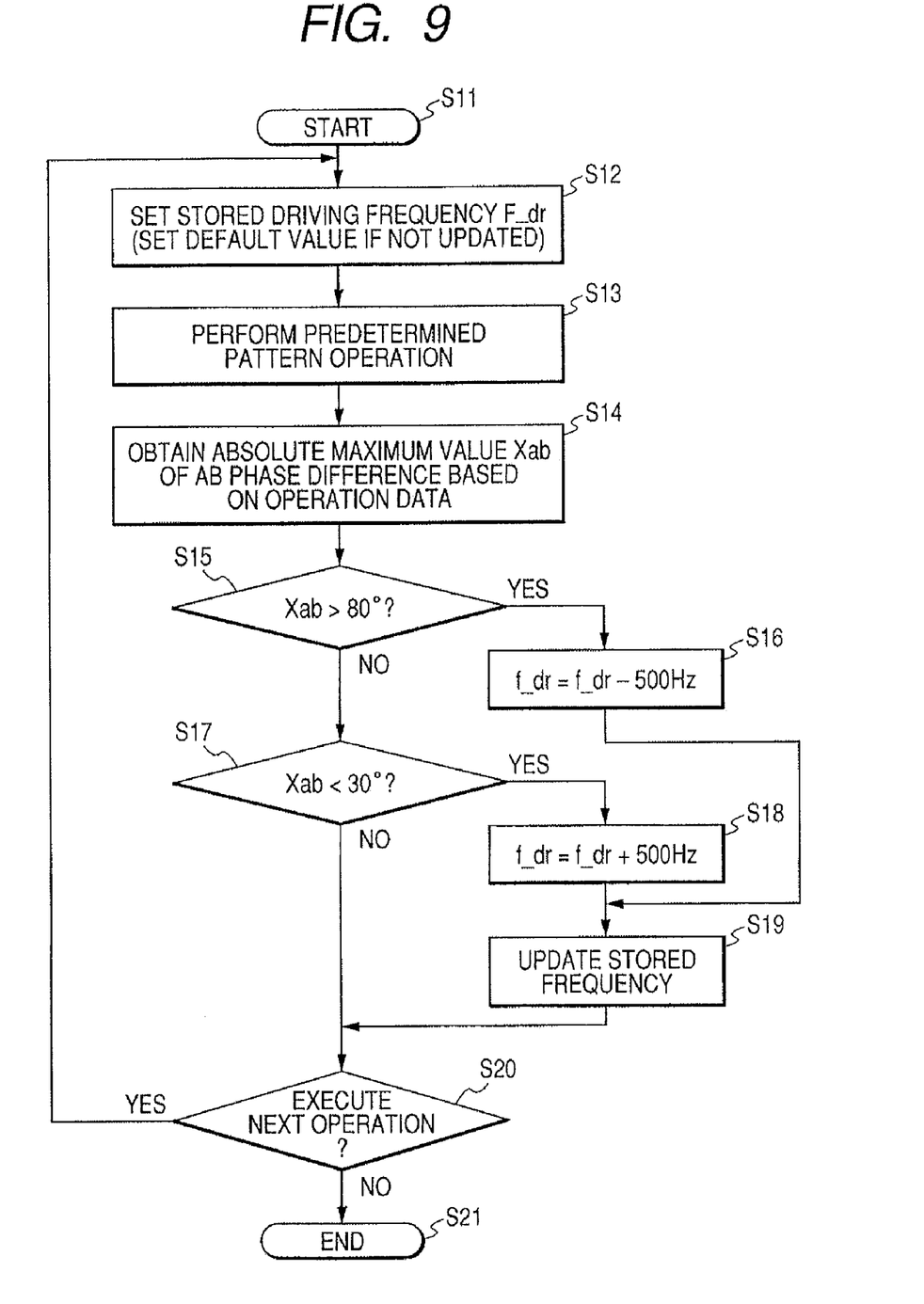
FIG. 9 is a flowchart showing an operation algorithm of the vibration wave motor.

FIG. 9 is a flowchart showing the operation algorithm of the vibration wave motor.

Referring to FIG. 9, first, a CPU 5 of a vibration wave motor driving circuit starts the operation algorithm of the vibration wave motor (step S11). Then, the CPU 5 sets a driving frequency f_dr stored in a memory (not shown) (step S12). In this case, a frequency at the end time of a last driving operation of the vibration wave motor is set as the driving frequency f_dr. However, if there is no last driving operation (i.e., not updated), a frequency (i.e., default value) expected to be an optimal frequency is set as the driving frequency f_dr from a shape or a driving frequency of the vibration wave motor.

The CPU 5 causes the moving member 4 to execute a predetermined pattern operation at the set driving frequency f_dr (step S13). Then, the CPU 5 obtains a maximum value Xab of an absolute value of an AB phase difference during the predetermined pattern operation of the moving member 4 (step S14). The CPU 5 judges whether Xab>80° is satisfied (step S15). If Xab>80° is satisfied, a driving frequency is set to "current frequency f_dr−500 Hz" based on a judgement that a driving frequency is too high (step S16). Subsequently, the CPU 5 updates a value of the driving frequency stored in the memory to the set value (step S19).

If Xab>80° is not satisfied, the CPU 5 judges whether Xab<30° is satisfied (step S17). If Xab<30° is satisfied, a driving frequency is set to "current frequency f_dr+500 Hz" based on a judgement that the driving frequency is too low (step S18). Then, the CPU 5 updates the value of the driving frequency stored in the memory to the set value (step S19). The frequencies increased/decreased with respect to the current frequency f_dr in the steps S16 and S18 are not limited to 500 Hz, but arbitrary frequencies can be set within a range not departing from the gist of the present invention.

Next, the CPU 5 judges whether to execute a next operation of the vibration wave motor (step S20). The CPU 5 returns to the processing of the step S12 upon judgment that the next operation of the vibration wave motor is executed, and finishes the processing upon judgment that the next operation of the vibration wave motor is not executed (step S21).

The CPU 5 judges whether the driving frequency is within an optimal frequency range when the moving member 4 moves with a certain operation pattern during the operation of the vibration wave motor according to the flowchart. The CPU 5 executes control to change the driving frequency thereby setting it to an optimal driving frequency upon judgment that the driving frequency is not within the optimal frequency range. As can be understood from the above, conventionally, the vibration wave motor must be operated by carrying out frequency sweeping or the like to obtain the optimal driving frequency.

On the other hand, according to this embodiment, the frequency is decided to be the optimal driving frequency during the operation of the vibration wave motor, so it is possible to drive the vibration wave motor at the optimal driving frequency without any extra operation of the vibration wave motor.

According to this embodiment, a certain driving frequency is first fixed in the vibration wave motor, and whether to change the driving frequency is judged after execution of one operation of the vibration wave motor to change the driving frequency. However, this is in no way limitative of the present invention. Even an operation algorithm to change the driving frequency immediately after the AB phase difference exceeds the set range during the operation of the vibration wave motor can achieve the object of the invention.

As described above, according to this embodiment, when the driving frequency of the vibration wave motor is set to a certain driving frequency, and the operation amount of the AB phase difference exceeds the set range or does not reach the set range during the reciprocation of the moving member 4 in the predetermined section, the driving frequency is changed. As a result, the vibration wave motor can be driven without detecting the optimal driving frequency at the time of staring the vibration wave motor. Hence, it is possible to shorten the starting time of the vibration wave motor and to smoothly control the moving member.

Fourth Embodiment

A fourth embodiment of the present invention is different from the first embodiment in that control described below is carried out in a vibration wave motor. Other features of this embodiment correspond to those of the first embodiment (described with reference to FIGS. 1 and 2), and thus description thereof will be omitted.

Figure 10:
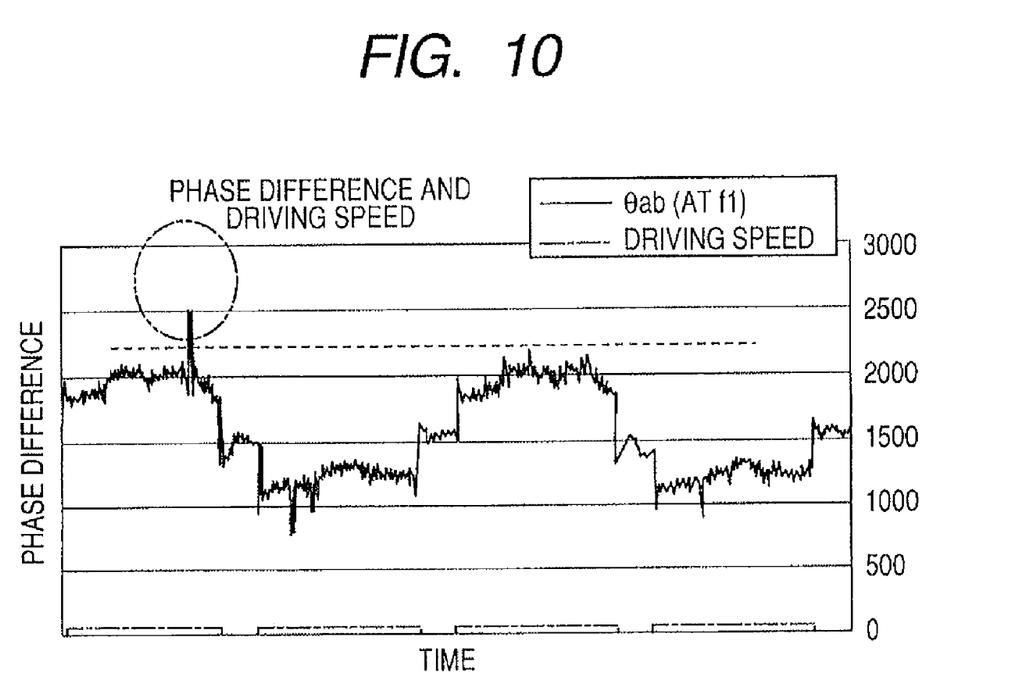
FIG. 10 is a diagram showing a relation between an AB phase difference and a driving speed of a moving member with respect to time in a vibration wave motor according to a fourth embodiment of the present invention.

FIG. 10 is a diagram showing a relation between an AB phase difference and a driving speed of a moving member with respect to time in the vibration wave motor of this embodiment.

Referring to FIG. 10, an abscissa indicates time, and an ordinate indicates an AB phase difference. AB phase difference characteristics of FIG. 10 basically indicate AB phase difference characteristics similar to those of FIG. 8. However, the vibration wave motor deteriorates in operation at a certain instant during its operation to suddenly increase a value of the AB phase difference (shown in a part indicated by a chain double-dashed line in the drawing). This occurs because of a slight change in a friction surface between projection portions 3 of a vibration member 2 and the moving member 4 of the vibration wave motor, or instantaneous instability of contact between friction surfaces.

However, in the vibration wave motor, the phenomenon of a deteriorated operation occurs for other reasons. This phenomenon is accidental, and the normal operation is restored after this instant. In this case, if the vibration wave motor is operated based on the operation algorithm of the third embodiment, a maximum value of the AB phase difference exceeds a certain value to lower the frequency.

On the other hand, according to this embodiment, an operation algorithm that does not react with the above accidental fluctuation is employed. The operation algorithm of the vibration wave motor of FIG. 11 will be described below.

Figure 11:
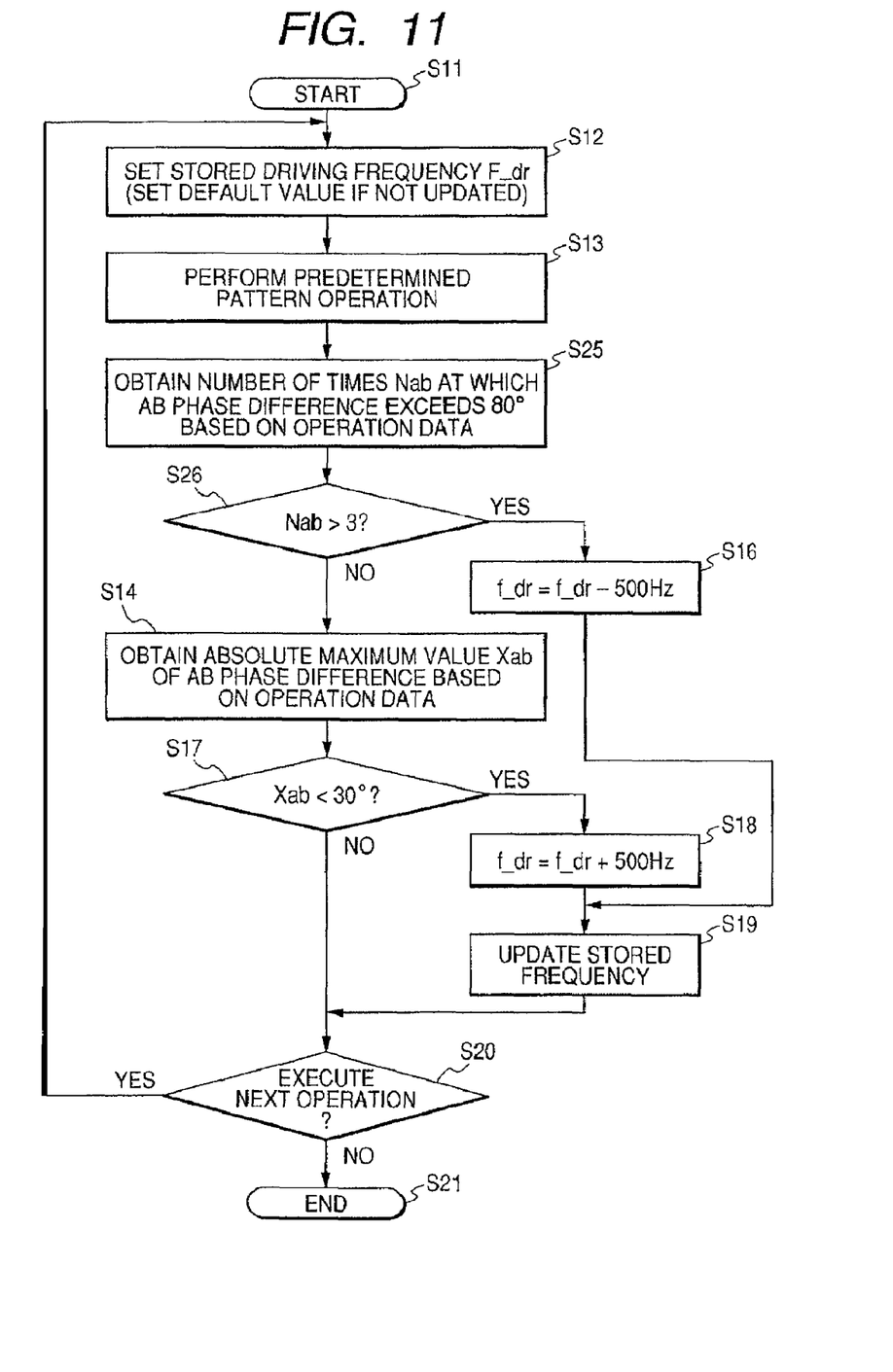
FIG. 11 is a flowchart showing an operation algorithm of the vibration wave motor.

FIG. 11 is a flowchart showing the operation algorithm of the vibration wave motor.

Referring to FIG. 11, processing of steps S11 to S13 is similar to that of the steps S11 to S13 of FIG. 9, and thus description thereof will be omitted. A CPU 5 of the vibration wave motor driving circuit counts the number of times Nab of the AB phase difference exceeding 80° based on operation data (i.e., AB phase difference operation amount) (step S25). The CPU 5 judges whether the counted number of times Nab exceeds a predetermined number of times (3 times according to this embodiment) (step S26). The CPU 5 executes control to start a driving frequency changing operation if the counted number of times Nab exceeds 3 (step S16). Processing of the step S16 and after is similar to that of the third embodiment.

If a maximum value Xab of an absolute value of the AB phase difference satisfies Xab<30°, the CPU 5 executes an operation of increasing a driving frequency when the maximum value Xab does not exceed 30° as in the case of the third embodiment.

According to this embodiment, by executing the operation algorithm to change the driving frequency when the number of times (or frequency) of the AB phase difference exceeding 80° exceeds a certain number of times, it is not necessary to change the frequency even when the AB phase difference instantaneously exceeds the set range as in the case of FIG. 10. Thus, it is possible to prevent needless changes in driving frequency.

According to this embodiment, the range of the AB phase difference is set to 30° to 80°. However, this range is in no way limitative of the present invention. Effects can be obtained by designating an optimal range without departing from the gist of the invention. Needless to say, other numerical values (i.e., amount of changing the frequency, the number of times of the phase difference exceeding a certain value to change the frequency, and the like) are not limited to the above.

As described above, according to this embodiment, when the driving frequency of the vibration wave motor is set to a certain driving frequency, and the number of times of the operation amount of the AB phase difference exceeding the set range during the reciprocation of the moving member 4 in the predetermined section exceeds the set value, the driving frequency is changed. As a result, the vibration wave motor can be driven without detecting the optimal driving frequency at the time of starting the vibration wave motor. Hence, it is possible to shorten the starting time of the vibration wave motor and to smoothly control the moving member.

Other Embodiments

The first to fourth embodiments have been described by taking the examples of the vibration wave motor and the vibration wave motor driving circuit. However, the present invention can be applied to a case where a vibration wave motor and a vibration wave motor driving circuit are mounted in an imaging apparatus (camera, video camera, or the like) to drive a lens holder.

The object of the present invention can also be achieved by supplying a storage medium storing software program codes to realize the functions of the embodiments to a system or an apparatus, and reading and executing the program codes stored in the storage medium by a computer (or CPU, MPU, or the like) of the system or the apparatus.

In this case, the program codes read from the storage medium themselves realize the functions of the embodiments, and the program codes and the storage medium storing the program codes constitute the present invention.

Examples of the storage medium for supplying the program codes include a floppy (registered trademark) disk, a hard disk, a magneto-optical disk, an optical disk such as a CD-ROM, a CD-R, a CD-RW, a DVD-ROM, a DVD-RAM, a DVD-RW, or a DVD+RW, a magnetic tape, a nonvolatile memory card, and a ROM. The program codes may be downloaded via a network.

Not only the realization of the functions of the embodiments by execution of the read program codes of the computer, but also realization of the functions of the embodiments by execution of a part or all of actual processing by an operating system (OS) or the like operated on the computer based on instructions of the program codes is included within the scope of the present invention.

Furthermore, the program codes read from the storage medium are written in a memory disposed in a function extension board inserted into a computer or a function extension unit connected to the computer, and then a CPU or the like disposed in the extension board or the extension unit executes a part or all of processing of the extension functions based on instructions of the next program codes, thereby realizing the functions of the embodiments. This is also included within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2005-330681, filed Nov. 15, 2005, which is hereby incorporated by reference herein in its entirety.

What is claimed is:

1. A motor driving method for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated by applying alternating voltages of which frequencies are the same but one of which phases is reverse that of the other to the first electrode and the second electrode, and a driven member which is in contact with the projection portion and driven by the projection portion, said method comprising the steps of:

detecting a driving speed of the driven member;

changing a phase difference between the alternating voltages, each of which is being applied to the first electrode and the second electrode, respectively, in a state that the frequencies are fixed at a constant value, so as to set the driving speed of the driven member to a predetermined speed; and changing the frequencies so as to set the changed phase difference within a predetermined phase difference range, in a case that the changed phase difference which is set to drive the driven member at the predetermined speed is outside the predetermined phase difference range, wherein in the step of changing the phase difference, a ratio of amplitudes of the vibrations of the first vibration mode and the second vibration mode is changed by changing the phase difference so as to drive the driven member at the predetermined speed.

2. A motor driving method according to claim 1, wherein the phase difference changing step is executed while the driven member is being moved to a target position.

3. A motor driving method according to claim 1, wherein the phase difference changing step is executed while the driven member is being reciprocated in a predetermined section.

4. A motor driving method according to claim 1, wherein the vibration member drives the driven member by generating, in combination, a first bending vibration generated by applying the driving voltages of reverse phases to the electro-mechanical energy conversion element, and a second bending vibration generated by applying the driving voltages of identical phases to the electro-mechanical energy conversion element.

5. A motor driving method according to claim 1, wherein the detecting step and the phase difference changing step are performed in parallel with each other.

6. A motor driving method according to claim 1, wherein the frequencies are not changed in a case that the driving speed is lower than or equal to the predetermined speed.

7. A motor driving method for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated by applying alternating voltages of which frequencies are the same but one of which phases is reverse that of the other to the first electrode and the second electrode, and a driven member which is in contact with the projection portion and driven by the projection portion, said method comprising the steps of:

detecting a driving speed of the driven member;

changing a phase difference between the alternating voltages, each of which is being applied to the first electrode and the second electrode, respectively, in a state that the frequencies are fixed at a constant value, so as to set the driving speed of the driven member to a predetermined speed; and changing the frequencies so as to set the changed phase difference within a predetermined phase difference range, in a case that the changed phase difference, which is set to drive the driven member at the predetermined speed, goes beyond by a predetermined number of times the predetermined phase difference range, wherein in the step of changing the phase difference, a ratio of amplitudes of the vibrations of the first vibration mode and the second vibration mode is changed by changing the phase difference so as to drive the driven member at the predetermined speed.

8. A motor driving method for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated by applying alternating voltages of which frequencies are the same but one of which phases is reverse that of the other to the first electrode and the second electrode, and a driven member which is in contact with the projection portion and driven by the projection portion, said method comprising the steps of:

a detecting a driving speed of the driven member;

changing a phase difference between the alternating voltages, each of which is being applied to the first electrode and the second electrode, respectively, in a state that the frequencies are fixed at a constant value, so as to set the driving speed of the driven member to a predetermined speed; and changing the frequencies so as to set the changed phase difference to exceed a predetermined phase difference level, in a case that the changed phase difference, which is set to drive the driven member at the predetermined speed, does not exceed the predetermined phase difference level, wherein in the step of changing the phase difference, a ratio of amplitudes of the vibrations of the first vibration mode and the second vibration mode is changed by changing the phase difference so as to drive the driven member at the predetermined speed.

9. A motor driving method according to claim 8, wherein the phase difference changing step is executed while the driven member is being moved to a target position.

10. A motor driving method according to claim 8, wherein the phase difference changing step is executed while the driven member is being reciprocated in a predetermined section.

11. A motor driving apparatus for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated by applying alternating voltages of which frequencies are the same but one of which phases is reverse that of the other to the first electrode and the second electrode, and a driven member which is in contact with the projection portion and driven by the projection portion, said motor driving apparatus comprising:

a detecting unit for detecting a driving speed of the driven member;

a controlling unit changing a phase difference between the alternating voltages, each of which is being applied to the first electrode and the second electrode, respectively, in a state that the frequencies are fixed at a constant value, so as to set the driving speed of the driven member to a predetermined speed; and a changing unit for changing the frequencies so as to set the changed phase difference within a predetermined phase difference range, in a case that the changed phase difference which is set to drive the driven member at the predetermined speed is outside the predetermined phase difference range, wherein said controlling unit changes a ratio of amplitudes of the vibrations of the first vibration mode and the second vibration mode by changing the phase difference so as to drive the driven member at the predetermined speed.

12. A motor driving apparatus according to claim 11, wherein the frequencies are not changed in a case that the driving speed is lower than or equal to the predetermined speed.

13. A motor driving apparatus for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated b a 1 in alternating voltages of which frequencies are the same but one of which phases is reverse to the first electrode and the second electrode, and a driven member which is in contact with the projection portion and driven by the projection portion, said motor driving apparatus comprising:

a detecting unit for detecting a driving speed of the driven member;

a controlling unit changing a phase difference between the alternating voltages, each of which is being applied to the first electrode and the second electrode, respectively, in a state that the frequencies are fixed at a constant value, so as to set the driving speed of the driven member to a predetermined speed; and a changing unit for changing the frequencies so as to set the changed phase difference within a predetermined phase difference range, in a case that the changed phase difference which is set to drive the driven member at the predetermined speed goes beyond by a predetermined number of times the predetermined phase difference range, wherein said controlling unit changes a ratio of amplitudes of the vibrations of the first vibration mode and the second vibration mode by changing the phase difference so as to drive the driven member at the predetermined speed.

14. A motor driving apparatus for controlling driving of a vibration wave motor including a vibration member which has a first electrode and a second electrode formed on an electro-mechanical energy conversion element and a projection portion thereon, and generates an elliptic motion on the projection portion by combining vibrations of a first vibration mode and a second vibration mode, the vibration of the first vibration mode being generated by applying alternating voltages of which frequencies and phases are the same to the first electrode and the second electrode, the vibration of the second vibration mode being generated by applying alternating voltages of which frequencies are the same but one of which phases is reverse that of the other to the first electrode and the second electrode, and a driven member which is in contact with the projection portion and driven by the projection portion, said motor driving apparatus comprising:

a detecting unit for detecting a driving speed of the driven member;

a controlling unit changing a phase difference between the alternating voltages, each of which is being applied to the first electrode and the second electrode, respectively, in a state that the frequencies are fixed at a constant value, so as to set the driving speed of the driven member to a predetermined speed; and a changing unit for changing the frequencies so as to set the changed phase difference to exceed a predetermined phase difference level, in a case that the changed phase difference, which is set to drive the driven member at the predetermined speed, does not exceed the predetermined phase difference level, wherein said controlling unit changes a ratio of amplitudes of the vibrations of the first vibration mode and the second vibration mode by changing the phase difference so as to drive the driven member at the predetermined speed.

* * * * *